UNITED STATES PATENT OFFICE.

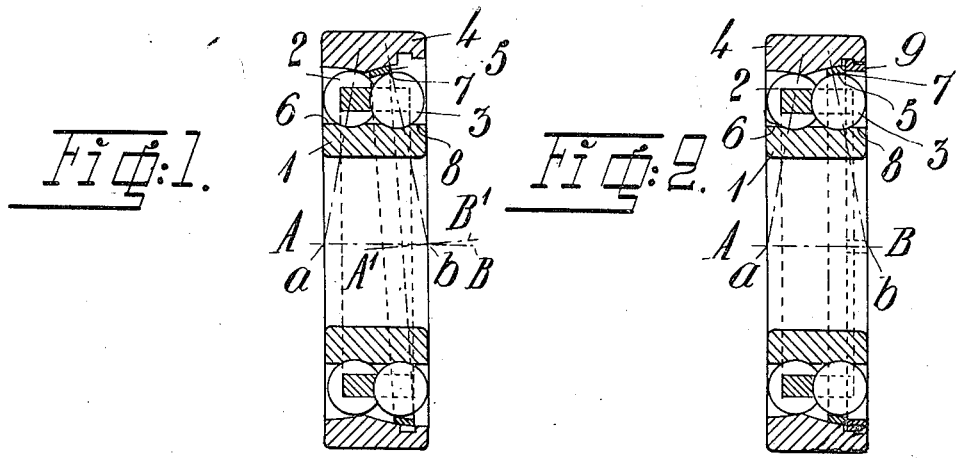
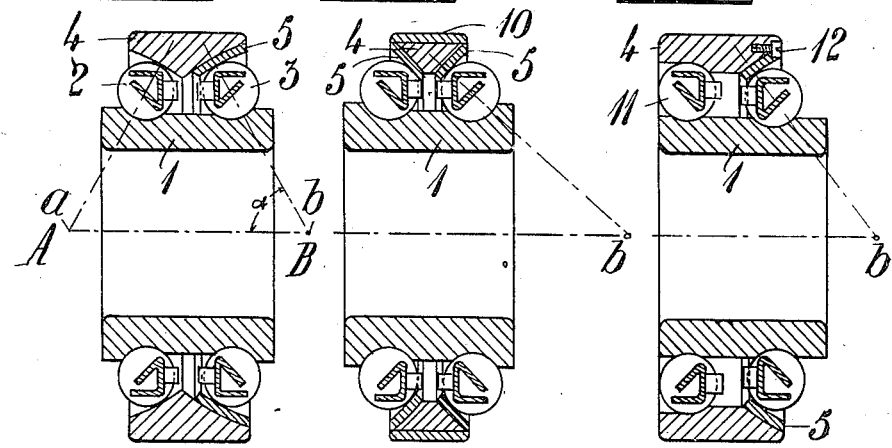
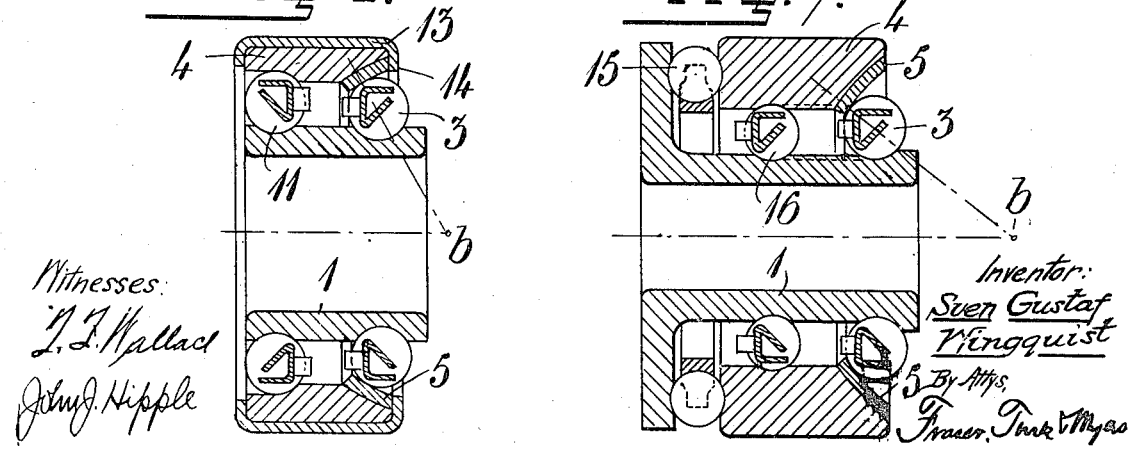

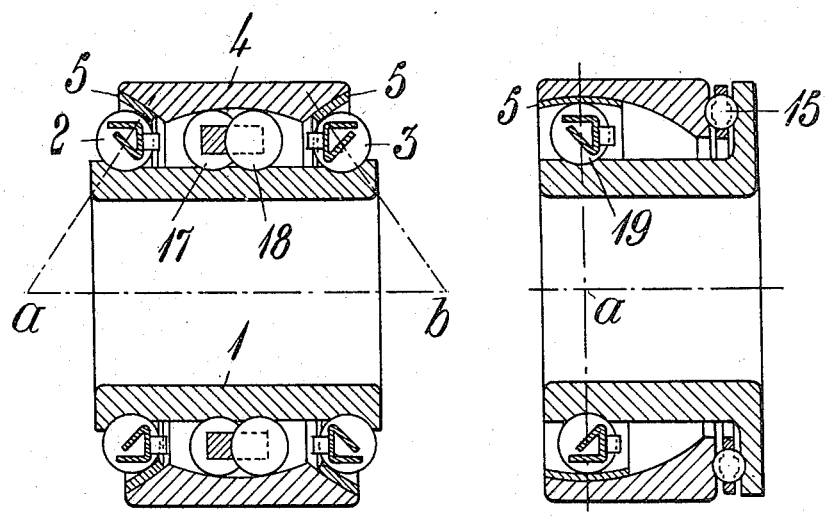
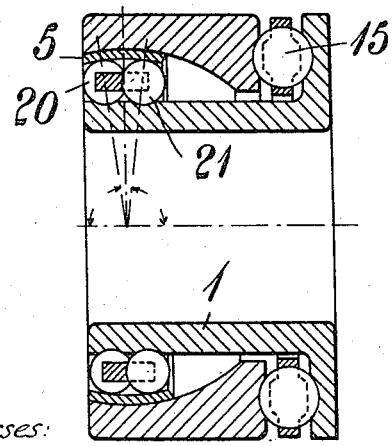
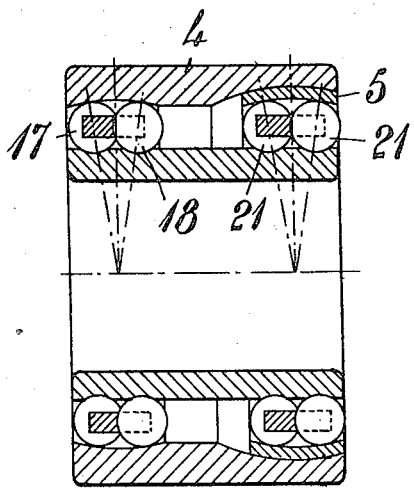

SVEN GUSTAF WINGQUIST, OF GOTTENBORG, SWEDEN, ASSIGNOR, BY MESNE ASSIGNMENTS, TO S. K. F. BALL BEARING COMPANY, OF HARTFORD, CONNECTICUT, A CORPORATION OF CONNECTICUT.

BALL OR ROLLER BEARING.

1,195,756.  Specification of Letters Patent.  Patented Aug. 22, 1916.

Application filed July 14, 1914. Serial No. 850,886.

*To all whom it may concern:*

Be it known that I, SVEN GUSTAF WINGQUIST, a citizen of the Kingdom of Sweden, residing at Gottenborg, Sweden, have invented new and useful Improvements in Ball or Roller Bearings, of which the following is a specification.

This invention relates to ball bearings of the ring type with two or more series of balls and a spherical outer track for one or more of said ball series and has for its object to attain a simple mounting of the bearing without the use of special threads or openings for filling in the balls so that the bearing forms a whole easy to mount and affording the advantage that the bearing rings are not weakened by recesses or the like, and that there are no parts of the bearing which are liable to loosen and, owing thereto, to damage the bearing or to cause incorrect adjustment of the parts of the bearing in relation to one another.

The invention is also applicable to so called combined ball bearings, as for instance bearings provided with one or more series of balls adapted to sustain obliquely directed pressures, or bearings provided, on the one side, with one or more series of balls adapted to sustain substantially radial pressures and, on the other side, with one or more series of balls adapted to sustain substantially axial pressures and so on.

With these objects in view the invention consists, chiefly, in this that the outer track of one or more series of balls consists of a ring disposed in the outer bearing ring and having a spherical inner surface, said track ring being adapted to be swung into an oblique position so that the balls can be filled in between said ring and the inner bearing ring whereas the track ring when swung to central position, closes the opening through which the balls were filled in and at the same time locks the tracks of the other ball series in correct positions.

The invention consists further in detail arrangements and special forms of bearings of the kind mentioned above as will be more explicitly described below.

In order that my invention may be fully understood reference should be made to the accompanying drawings in which:—

Figure 1 shows a ball bearing having two series of balls and a swingable ring located at the outer track of the one series of balls, said ring being shown in an oblique position. Fig. 2 shows the same bearing and the ring in central position after the balls have been filled in. Figs. 3 and 4 are different constructional forms of ball bearings having two series of balls and adapted to sustain oblique pressures. Figs. 5 and 6 illustrate combined radial and conical bearings having a swingable track for the series of balls adapted to sustain obliquely directed pressures. Fig. 7 shows a bearing having three series of balls and Fig. 8 shows a bearing having four series of balls. Figs. 9 and 10 illustrate different forms of combined radial and axial bearings, and Fig. 11 shows a bearing composed of two ball bearings each of which has two series of balls.

Referring to the drawings, the bearing shown in Figs. 1 and 2 is a ball bearing having two series of balls and provided with outer tracks each in the shape of a frustum of a sphere whose ends are unequal circles, these tracks may be termed oblique spherical zones, the centers $a$ and $b$ of which are located in the planes through the outer edges of the bearing rings. On account thereof, the said bearing is chiefly adapted to sustain radially directed pressures but may also sustain axial pressures in the one direction or the other. The inner ring 1 is as usual, provided with tracks for guiding both series of balls 2 and 3. The outer track of the series of balls 2 is formed by one half of the outer ring 4 while the track of the series of balls 3 is formed by a ring 5 which is inserted in the ring 4 and is swingable in relation thereto. When mounting this bearing, one may proceed in the following manner: First the series of balls 2 is placed around the inner ring 1, preferably in a ball cage not shown which receives the balls. Then the outer ring of the bearing is pushed in axial direction on the said series of balls, the balls then being retained in position by the projecting rim 6 of the inner ring and, if desired, also by the ball cage. Thereupon the loose outer track 5 is placed in an oblique position in the outer ring 4 of the bearing, as is shown in Fig. 1, so that the axis $A_1$—$B_1$ of the track forms an angle with the axis A—B of the bearing, the outwardly projecting rim 7 of the track 5 thereby being placed so far inward in the direction toward the center plane of the bearing that the balls of the right series of balls may be inserted, one at a time, into the enlarged space or opening between the outer rim 7 of the ring 5 and the annular rim 8 of the inner ring 1. If desired, the series of balls 3 may also be placed in a ball cage which is inserted between the bearing rings 1 and 4 before placing the loose ring 5 in position. During the insertion of the balls the cage is turned and will thereby be able to receive successively the balls inserted through the filling in space. Instead of turning the ball cage one may give the ring 5 a successively changed oblique position so that the filling in space, according as the balls are inserted, is moved around the ring. After the balls of the series 3 have been inserted, the ring 5 is swung to central position (Fig. 2) in which the axis of the ring coincides with the axis A—B of the bearing. The bearing is then finished, and the series of balls 3 is retained in outward direction by the annular rim 8 and, if necessary, also by the ball cage. If desired, a ball cage common to both series of balls or a separate ball cage for each series of balls may be used.

The swingable track 5 of the series of balls 3 does not extend to the end surface of the ring 4, and a narrow divided retaining ring 9 may be inserted into the ring 4 outside of the track 5 preventing unintentional swinging of said ring 5. Generally such a locking device is, however, not necessary, since the ring 5 is not exposed to any swinging forces. Should the retaining ring 9 loosen, the duration of the bearing is notwithstanding in no way jeopardized.

In Figs. 1 and 2 the track of the series 2 in the outer ring 4 is shown spherical. Such a shape of the track is not, however, of essential importance for the invention, since the track may be of any suitable shape.

The constructional form shown in Fig. 3 differs from that shown in Figs. 1 and 2 chiefly in this that the centers $a$ and $b$ of the spherical tracks are placed outside the outer rims of the tracks. Such a construction is more advantageous than that shown in Figs. 1 and 2, if the bearing, besides the usual radial load, has to sustain great axial loads or bending stresses working in an axial plane. The most suitable magnitude of the angle $\alpha$ between the direction of the ball pressure and the axis A—B of the bearing may be found by a simple calculation purporting to find the smallest value of the ball pressure at given loading conditions.

In the constructional forms shown in Figs. 1 to 3 inclusive the outer side as well as the inner side of the ring 5 are of spherical shape, and the said ring bears on a surface of the outer ring 4 likewise of spherical shape. The spherical shape of the outer surface of the ring 4 is not, however, of essential importance for the invention and for the same any other shape may be used.

In the bearing shown in Fig. 4 having two series of balls both series have outer tracks 5, 5 consisting of rings having a spherical inner surface. After the bearing has been mounted the rings may, if desired, be retained by a sleeve 10 or the like placed around the outer bearing ring. The rings 5, 5 serve, just as in the constructional forms described above, not only to permit the mounting by being adjusted suitably in relation to the outer ring but also to lock the different parts of the bearing which thereby are retained in correct positions while the balls are prevented from falling out as soon as the rings, after the balls have been filled in, are swung to central position.

Fig. 5 shows a combined radial and conical bearing. The left series of balls 11 serves only to sustain radial pressures and is for this purpose placed between a track in the inner ring 1 and a cylindrical track in the outer ring 4, the latter track being limited at the inner side by a shoulder, the cross section of which may be arc shaped or the like. The right series of balls, on the contrary, serves to sustain oblique pressures (combined radial and axial pressures) and is located between a track in the inner ring and a swingable ring 5 placed in the outer ring, the inner side of said swingable ring 5 being shaped as a spherical zone having its center $b$ outside the end surface of the bearing just as in the constructional forms shown in Figs. 3 and 4. In mounting the bearing, the series of balls 11 is first placed in the inner ring 1, for instance in a suitable ball cage, and then the outer ring 4 is pushed on the said series of balls. Thereupon the ring 5 is placed in an oblique position in the outer ring 4, and the balls of the series 3 are filled in, as described above, whereupon the ring 5 is swung to central position. If desired, the ring 5 may be retained in the said position by means of one or more screws 12, as is shown in the drawing.

The bearing shown in Fig. 6 differs from that shown in Fig. 5 mainly in this that in order to retain the ring 5 in central position there is placed outside the bearing ring 4 a sleeve 13 having a flange 14 which covers the outer end surface of the ring 5. The flanges of the sleeve 13 may be bent after the sleeve has been placed on the ring 4.

Fig. 7 shows a bearing having three series of balls. The left series 15 serves to sustain axial pressures, the middle series 16 to sustain radial pressures and the right series 3 to sustain oblique pressures. In mounting the bearing the left series of balls 15 is first placed in position, then the balls of the middle series are filled in through any suitable filling opening and finally the right series is mounted in the manner described above by swinging the ring 5 to an oblique position and inserting the balls through the opening formed thereby. When all the balls have been filled in and the ring 5 has been swung to central position, the bearing is mounted and the three series of balls are retained in correct positions.

In the bearing according to Fig. 8 having four series of balls all the outer tracks are spherical. The middle series 17 and 18 form a ball bearing having two series of balls, and the filling in of the balls of the latter series is effected by swinging the rings 1 and 4 in relation to each other. The two outer series of balls are arranged in the same manner as in the bearing shown in Fig. 3, and the filling in of the balls is effected in the same manner as in that bearing.

Fig. 9 shows a combined axial and radial bearing. The right series of balls 15 serves to sustain axial pressures while the left series 19 serves to sustain radial pressures. The outer track of the latter series is formed by a swingable ring 5 inserted into the outer ring, the inner surface of said swingable ring being spherical and having its center *a* in the plane of the series of balls. In mounting the bearing, the right series of balls 15 is first put in place and then the ring 5 is swung to an oblique position in which the balls of the left series 19 may be inserted in the manner described above.

The constructional form shown in Fig. 10 differs from that shown in Fig. 9 chiefly in this that the left side of the bearing is constructed as a spherical bearing having two series of balls 20 and 21. The mounting is effected in substantially the same manner as in the constructional form according to Fig. 9.

The bearing shown in Fig. 11 is composed of two spherical bearings each of which has two series of balls. At the left side of the bearing the two series of balls 17 and 18 are placed direct between the inner and outer bearing rings 1 and 4 respectively, while at the right side the outer track is formed by a swingable ring 5. In mounting the bearing both series of balls 17 and 18 at the left side are first put in place by swinging the rings of the bearing in relation to each other and by inserting the balls through the opening thus formed. Then the balls 20 and 21 at the right side of the bearing are put in place by swinging the ring 5 and inserting the balls through the opening thus formed whereafter the ring 5 is swung to central position.

It will be easily understood that the invention is not limited to the constructional forms shown in the drawing since several other combinations may be used. Further the invention is not limited to ball bearings but may also be applied to roller bearings the rollers of which have spherical or other working surfaces. Especially in the combined bearings, the parts of the bearings serving to sustain axial or radial pressures may be constructed with two or more series of balls or rollers.

Having thus described my invention, what I claim is:

1. A self-contained bearing including an integral outer and an integral inner bearing ring, rolling members arranged in a plurality of series between said rings, and a swingable ring seated in said outer bearing ring and having an inner spherical track surface for one of said series of rolling members, substantially as and for the purpose set forth.

2. A self-contained bearing including an integral outer and an integral inner bearing ring, rolling members arranged in a plurality of series between said rings, and a spherical outer track ring for one of said series of rolling members seated in said outer bearing ring and arranged to be swung from a central position into an oblique position in relation thereto, substantially as and for the purpose set forth.

3. A self-contained bearing including an integral outer and an integral inner bearing ring, rolling members arranged in a plurality of series between said rings, a track ring for one of said series of rolling members seated in said outer bearing ring and arranged to be swung from a central position into an oblique position in relation thereto, said swingable ring having spherical outer and inner surfaces, substantially as and for the purpose set forth.

4. A self-contained bearing including an integral outer and an integral inner bearing ring, rolling members arranged in a plurality of series between said rings, the outer bearing ring forming a spherical track, and a spherical outer track ring for one of said series of rolling members seated in said outer bearing ring and arranged to be swung from a central position into an oblique position in relation thereto, substantially as and for the purpose set forth.

5. A self-contained bearing including an integral outer and an integral inner bearing ring, rolling members arranged in a plurality of series between said rings, the outer bearing ring having a spherical track, and a spherical outer track ring for one of said series of rolling members seated in said outer bearing ring and arranged to be swung from a central position into an oblique position in relation thereto, said spherical track ring forming a frustum of a sphere whose ends are unequal circles, substantially as and for the purpose set forth.

6. In a ball bearing, the combination of an integral outer bearing ring forming at one end a spherical track, a swingable ring seated at the other end of said outer bearing ring and forming a second spherical track, said swingable ring having a spherical outer surface and being arranged to be swung in relation to said outer bearing ring, and rolling members arranged on each of said spherical tracks, substantially as and for the purpose set forth.

7. A self-contained bearing including an integral outer and an integral inner bearing ring, rolling members arranged in a plurality of series between said rings, the outer bearing ring having a track forming a frustum of a sphere whose ends are unequal circles, and a spherical outer track ring for one of said series of rolling members seated in said outer bearing ring and forming a frustum of a sphere whose ends are unequal circles, substantially as and for the purpose set forth.

8. A self-contained bearing including an integral outer and an integral inner bearing ring, rolling members arranged in a plurality of series between said rings, the outer bearing ring having a track forming a frustum of a sphere whose ends are unequal circles, and a spherical outer track ring for one of said series of rolling members seated in said outer bearing ring, said track ring forming a frustum of a sphere whose ends are unequal circles, having its larger opening turned outward, substantially as and for the purpose set forth.

9. A self-contained bearing including an integral outer and an integral inner bearing ring, rolling members arranged in a plurality of series between said rings, a spherical outer track ring for one of said series of rolling members seated in said outer bearing ring, and means for locking said spherical track ring in position in the outer bearing ring, substantially as and for the purpose set forth.

10. A self-contained bearing including an integral outer bearing ring having a spherical seat, a spherical track ring placed in the said spherical seat, said track ring forming a spherical raceway, an integral inner bearing ring, and rolling members arranged in a plurality of series between the said outer and inner bearing rings, one of said series of balls being in contact with the said spherical track ring, substantially as and for the purpose set forth.

In testimony that I claim the foregoing as my invention, I have signed my name in presence of two subscribing witnesses.

SVEN GUSTAF WINGQUIST.

Witnesses:
    AUG. SÖRENSEN,
    KARL RUNESKOG.